United States Patent Office 3,304,299
Patented Feb. 14, 1967

1

3,304,299
D-GLUCOPYRANO IMIDAZOLES
Charles J. Morel, Arlesheim, Basel-Land, Switzerland, assignor to Geigy Chemical Corporation, Greenburgh, N.Y., a corporation of Delaware
No Drawing. Filed May 28, 1965, Ser. No. 459,881
Claims priority, application Switzerland, June 9, 1964, 7,493/64
9 Claims. (Cl. 260—211.5)

The present invention concerns a process for the production of new imidazole derivatives as well as the new compounds obtained by this process which have valuable pharmacological properties.

It has been found that compounds of the general formula

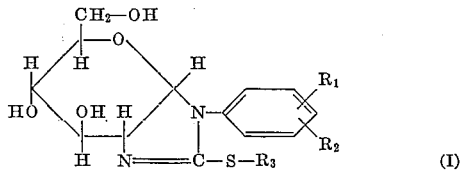

wherein $R_1$ and $R_2$ independently of each other represent hydrogen, a lower alkyl or alkoxy group or a halogen atom up to the atomic number 35, and $R_3$ represents a lower alkyl radical, and their pharmaceutically acceptable salts with inorganic and organic acids have valuable pharmacological properties, particularly antiphlogistic, analgesic and antipyretic activity. The antiphlogistic action of the compounds of general Formula I results also in a protective action against ultra-violet irradiation. The compounds of the general Formula I can be administered orally or rectally or, in the form of aqueous solutions of the pharmaceutically acceptable salts described in the following, also parenterally, in particular intramuscularly. They are useful in the relief of pain and for the treatment of inflammation of various origin, e.g. of rheumatic complaints, for which purpose they can be administered to adult patients in daily dosages of 100–1000 mg. orally or 50–500 mg. parenterally.

In the compounds of general Formula I and in the starting materials used therefor which are mentioned below, $R_1$ and $R_2$ independently of each other are e.g. hydrogen, the methyl, ethyl, isopropyl, tert. butyl, methoxy, ethoxy, n-propoxy, isopropoxy or n-butoxy radical, fluorine, chlorine or bromine. If both radicals $R_1$ and $R_2$ are not hydrogen, then one of them is preferably in the 3-position and the other in the 4-position of the phenyl radical. The radical $R_3$ is, for example, the methyl or ethyl radical.

The compounds of general Formula I are produced by reacting a salt of a compound the tautomeric enol form of which corresponds to the general Formula II

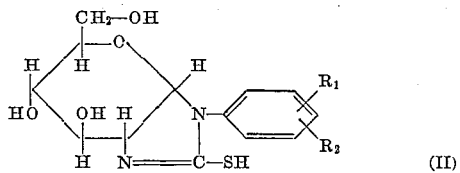

wherein $R_1$ and $R_2$ have the meanings given above, particularly a salt of a monovalent or divalent metal,

2 with a reactive ester of a lower alkanol, in particular with a halide. The reaction is performed while heating at temperatures between about 60 and 120° in a solvent which is inert to the reaction partners such as dimethyl formamide or dimethyl sulfoxide. Examples of salts of compounds of the general formula I are the alkali metal salts such as the sodium or potassium salts. The halides are used as reactive esters of lower alkanols, such as methyl iodide and ethyl bromide.

The production of starting materials of the general Formula II has been described in my Patent 3,158,598, issued November 24, 1964. This process consists in reacting D-glucosamine while heating with a phenyl mustard oil (phenyl isothiocyanate) substituted corresponding to the definition for $R_1$ and $R_2$, ethanol, for example, being used as solvent. Phenyl mustard oils that can be used in this process are, e.g., 3,4-dimethyl phenyl isothiocyanate, phenyl isothiocyanate,, 4-chlorophenyl isothiocyanate, 4-bromo-phenyl isothiocyanate, 4-fluoro-phenyl isothiocyanate, 2,5-dimethoxy-phenyl isothiocyanate, 3-chloro-4-methyl-phenyl isothiocyanate, etc. The reaction product thus obtained is then exposed to ring closing conditions, for example by adding a small amount of sulfuric acid to the reacting solution containing it and then boiling for a short time or by first isolating the reaction product, e.g. by evaporating the reaction solution, and then heating it with aqueous, e.g. 20%-acetic acid at about 95–100°. The compound of general Formula II can be isolated, after an optional removal of the sulphuric acid, by evaporating the reaction solution and recrystallising the residue, e.g. from water or ethanol/water. Another process for the production of starting materials of general Formula II is described in British Patent No. 924,985.

The compounds of general Formula I form monoacid salts with inorganic and organic acids. Generally, especially the pharmaceutically acceptable acid addition salts are more easily soluble in water than the free bases. Their good solubility permits preparation of injectable solutions of 10% w./v. and higher content of active substance, rendering them useful for parenteral application. Aqueous solutions of these salts are preferably produced by dissolving corresponding amounts of the free bases and acids in water. Examples of acids which can be used for the formation of pharmaceutically acceptable salts are: hydrochloric acid, hydrobromic acid, sulphuric acid, phosphoric acid, methane sulphonic acid, ethane sulphonic acid, ethane disulphonic acid, β-hydroxyethane sulphonic acid, acetic acid, succinic acid, fumaric acid, maleic acid, lactic acid, malic acid, tartaric acid, citric acid, benzoic acid, salicylic acid and mandelic acid; hydrochloric acid, hydrobromic acid, methane sulphonic acid and citric acid are preferred.

As mentioned above, the new compounds of general Formula I are administered orally, rectally or, in the form of aqueous solutions of their salts, also parenterally. Usual dosage units such as tablets, dragées (sugar coated tablets), suppositories or ampoules preferably contain 25–500 mg. of a compound of the general Formula I or, in aqueous solution, 25–250 mg. of a non-toxic salt thereof, corresponding to the daily dosages given above.

Dosage units for oral administration preferably contain between 1 and 90% of a compound of the general Formula I as active ingredient. They are produced by combining the active ingredient, for example, with solid pulverulent carriers such as lactose, saccharose, sorbitol, mannitol; starches such as potato starch, maize starch or amylopectin, also laminaria powder or citrus pulp powder; cellulose derivatives or gelatines, optionally with the addition of lubricants such as magnesium or calcium stearate or polyethylene glycols (carbo-waxes) of suitable molecular weights, to form tablets or dragée cores. The latter are coated, for example, with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between varying dosages of active substance.

Examples of dosage units for rectal administration are suppositories which consist of a combination of a compound of general Formula I with a neutral fatty foundation, or also gelatine rectal capsules which contain a combination of a compound of general Formula I with polyethylene glycols (carbo-waxes) of suitable molecular weight.

Ampoules for parenteral, particularly intramuscular, administration contain a water soluble, non-toxic salt of a compound of general Formula I in a concentration of preferably 1–5%, optionally together with suitable stabilising agents and buffer substances, in aqueous solution. By pharmaceutically acceptable salts of compounds of the general Formula I are meant salts with those acids which, in the dosages of the salts used for therapeutical purposes, do not give rise to toxic symptoms.

"Low" and "lower" used herein in connection with an aliphatic radical means that such radical has from 1 to 4 carbon atoms.

The following non-limitative examples illustrate the production of the new compounds of general Formula I but is by no means the only method of performing same. The temperatures are given in degrees centigrade.

*Example 1*

2.75 g. of 2-thiono-3-(3',4'-dichlorophenyl)-4,5-D-glucopyrano-imidazolidine and 17.43 ml. of 0.43 N alcoholic potassium hydroxide solution are stirred together for 15 minutes at room temperature whereupon the starting material dissolves after a short time and soon the potassium salt precipitates. The crystal slurry so obtained is evaporated to dryness in vacuo at 20–25°. The potassium salt which remains is dissolved in 37.5 ml. of dimethyl formamide, 0.6 ml. of ethyl iodide are added to the solution and the whole is stirred for 3 hours at 90°. The clear solution is then evaporated in vacuo at 65°. After cooling the viscous residue is triturated with 30 ml. of water whereupon it becomes solid. The solid is filtered off under suction, washed with water and dried in vacuo. After recrystallisation from acetonitrile, 2 - ethylthio - 3-(3',4'-dichloro-phenyl)-4,5-D-glucopyrano-Δ¹-imidazoline is obtained which melts at 163–164° (with decompositions).

The same compound is obtained if, instead of 0.6 ml. of ethyl iodide, 0.75 ml. of ethyl bromide is used and otherwise the procedure given above is followed.

Compounds of general Formula I, for example, having the radicals $R_1$, $R_2$ and $R_3$ given in the table are obtained in an analogous manner:

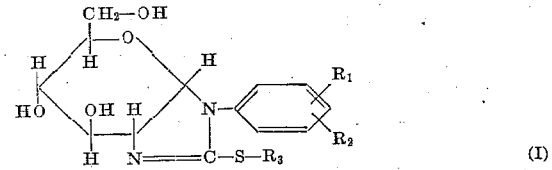

(I)

| Ex. No. | $R_1$ | $R_2$ | $R_3$ | $[\alpha]_D^{25°}$ in (DMF) | M.P. |
|---|---|---|---|---|---|
| 2 | 4-Cl | H | —$C_2H_5$ | +99.6° (c=0.95) | 158–159° (from ethanol). |
| 3 | 4-OCH₃ | H | —$C_2H_5$ | +38.6° (c=0.99) | 170–172° (from ethanol). |
| 4 | 4-CH₃ | 3-CH₃ | —$C_2H_5$ | +70.0° (c=0.99) | 201–203° (from ethanol). |
| 5 | 4-CH₃ | H | —$C_2H_5$ | +72.0° (c=0.97) | 184–186° (from ethanol). |
| 6 | 4-CH₃ | 3-Cl | —$C_2H_5$ | +85.7° (c=1.27) | 177–179° (from ethanol). |
| 7 | H | H | —$C_2H_5$ | +76.2° (c=1.14) | 188–190° (from H₂O); crystal modification 165–167° (from H₂O). |
| 8 | 2-Cl | H | —$C_2H_5$ | +65.6° (c=1.05) | 166–168° (from H₂O). |

I claim:
1. A compound of the formula

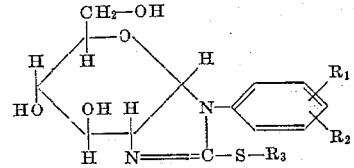

wherein each of $R_1$ and $R_2$ represents a member selected from the group consisting of hydrogen, lower alkyl, lower alkoxy and halogen of an atom member up to 35 inclusive, and $R_3$ represents lower alkyl.

2. 2-ethylthio-3-(3',4'-dichloro-phenyl)-4,5 - D - glucopyrano-imidazoline.
3. ethylthio-3-(4'-chloro-phenyl)-4,5-D - glucopyrano-imidazoline.
4. 2-ethylthio-3-(4'-methoxy-phenyl)-4,5 - D - glucopyrano-imidazoline.
5. 2 - ethylthio-3-(3',4'-dimethyl-phenyl)-4,5-D-glucopyrano-imidazoline.
6. 2-ethylthio-3-(4'-methyl-phenyl)-4,5 - D - glucopyrano-imidazoline.
7. 2-ethylthio-3-(3'-chloro - 4' - methyl-phenyl)-4,5-D-glucopyrano-imidazoline.
8. 2-ethylthio - 3 - phenyl-4,5-D-glucopyrano-imidazoline.
9. 2-ethylthio-3-(2'-chloro-phenyl) - 4,5 - D - glucopyrano-imidazoline.

No references cited.

LEWIS GOTTS, *Primary Examiner.*

JOHNNIE R. BROWN, *Assistant Examiner.*